United States Patent [19]

Reiffert et al.

[11] Patent Number: 4,484,598

[45] Date of Patent: Nov. 27, 1984

[54] PNEUMATIC CONTROL APPARATUS

[75] Inventors: Werner Reiffert, Bochum; Dieter Peters, Witten; Joachim Wiendahl, Dortmund, all of Fed. Rep. of Germany

[73] Assignee: J. D. Neuhaus, Witten, Fed. Rep. of Germany

[21] Appl. No.: 385,878

[22] Filed: Jun. 7, 1982

[30] Foreign Application Priority Data

Jun. 10, 1981 [DE] Fed. Rep. of Germany ... 8117890[U]

[51] Int. Cl.[3] .............................................. F16K 31/12

[52] U.S. Cl. ................................ 137/613; 137/625.69; 137/505.18

[58] Field of Search .............. 137/625.69, 596, 505.18, 137/613

[56] References Cited

U.S. PATENT DOCUMENTS

| | | | |
|---|---|---|---|
| 318,000 | 5/1885 | Jefferies | 137/625.69 |
| 941,153 | 11/1909 | Krichbaum | 137/505.18 |
| 2,481,293 | 9/1949 | Cooney | 137/625.69 |
| 3,513,876 | 5/1970 | Tarbox | 137/596 |
| 3,680,596 | 8/1972 | Pickett | 137/625.69 |
| 3,902,522 | 9/1975 | Karenfeld | 137/505.18 |

FOREIGN PATENT DOCUMENTS

| | | | |
|---|---|---|---|
| 23872 | of 1909 | United Kingdom | 137/625.69 |

*Primary Examiner*—A. Michael Chambers
*Attorney, Agent, or Firm*—Banner, Brich, McKie & Beckett

[57] ABSTRACT

A pneumatic control apparatus for an interchangeably operable pneumatic device in which both the shut-off reversing valve for selectively supplying a flow of compressed air to the pneumatic device and a pressure reducing valve for restricting the pressure to a determined pre-selectable value, are located in a single housing.

4 Claims, 2 Drawing Figures

PNEUMATIC CONTROL APPARATUS

BACKGROUND OF THE INVENTION

This invention relates to a pneumatic control apparatus for an interchangeably operable pneumatic device, which apparatus is equipped with a shut-off reversing valve for selectively shutting off and supplying a flow of compressed air to the pneumatic device to achieve each of two movements, and is equipped with a pressure reducing valve for restricting the pressure to a determined pre-selectable value.

Pneumatic control apparatus of this type have been known for a long time. In particular, in the case of so-called direct controls, i.e. in which the power flow supplied to the pneumatic device is subjected to a control, the shut-off reversing valve and the pressure reducing valve are in different locations. This applies, in particular, to arrangements in which the shut-off reversing valve is suspended from a device as an operational unit, as for example in the case of pneumatic lifting trains or pneumatically operated shunting trolleys on monorail conveyors. Since, moreover, in the case of direct controls, the members to be handled by the staff have to be of a relatively large and bulky design, the accommodation of the pressure reducing valve in the vicinity of the shut-off-reversing valve is still extremely undesirable, because in that case, the operational apparatus is even more unwieldy.

However, in the case of the control of considerable capacities, delays are caused due to the lines which are present as a result of the distance between the two valves, which delays may have a negative influence on the response behaviour and, in some cases, may also result in oscillations in the control system. In such an event, it may happen that the pre-selected pressure value is exceeded for a short time, which is particularly undesirable for safety reasons.

SUMMARY OF THE INVENTION

Thus, an object of the present invention is to provide a pneumatic control apparatus of the initially-mentioned type which, in spite of a high capacity, provides manageable operation and virtually prevents the occurrence of delays or oscillations in the response behaviour.

Thus, according to the present invention, there is provided a pneumatic control apparatus for an interchangeably operable pneumatic device comprising a shut-off-reversing valve for selectively shutting off and supplying a flow of compressed air to the pneumatic device to achieve each of two movements and a pressure reducing valve for restricting the pressure to a determined preselectable value, characterised in that both valves are positioned inside a single housing.

In the design according to the present invention of the pneumatic control apparatus, there is only a very short distance between the pressure reducing valve and the shut-off reversing valve, in which a pressure buildup or a drop in pressure takes place as it were without delay and in which there are no gas columns which could stimulate oscillations. When the longitudinal axes of both valves are positioned parallel to each other, the connection paths may be reduced to one passage point, because in this manner, the outlet of the pressure reducing valve opens out into the shut-off reversing valve.

It is true that the constructional volume of a former pure shut-off reversing valve is slightly smaller compared with that of embodiments of the pneumatic control apparatus of the present invention. However, it should be considered that hitherto, a handle or the like had to be provided on the adjusting member of the valve as an abutment for the manual adjusting devices, which handle may be omitted in embodiments of the present invention, because the housing may be grasped altogether in a reliable manner. Due to the inside walls of the housing which may partly be used jointly for the two valves, the overall volume is smaller than an arrangement comprising two separate valves which are joined together.

BRIEF DESCRIPTION OF THE DRAWINGS

Embodiments of the present invention will now be described, by way of example, with reference to the accompanying drawings, in which.

DETAILED DESCRIPTION OF PREFERRED EMBODIMENTS

Figure 1:
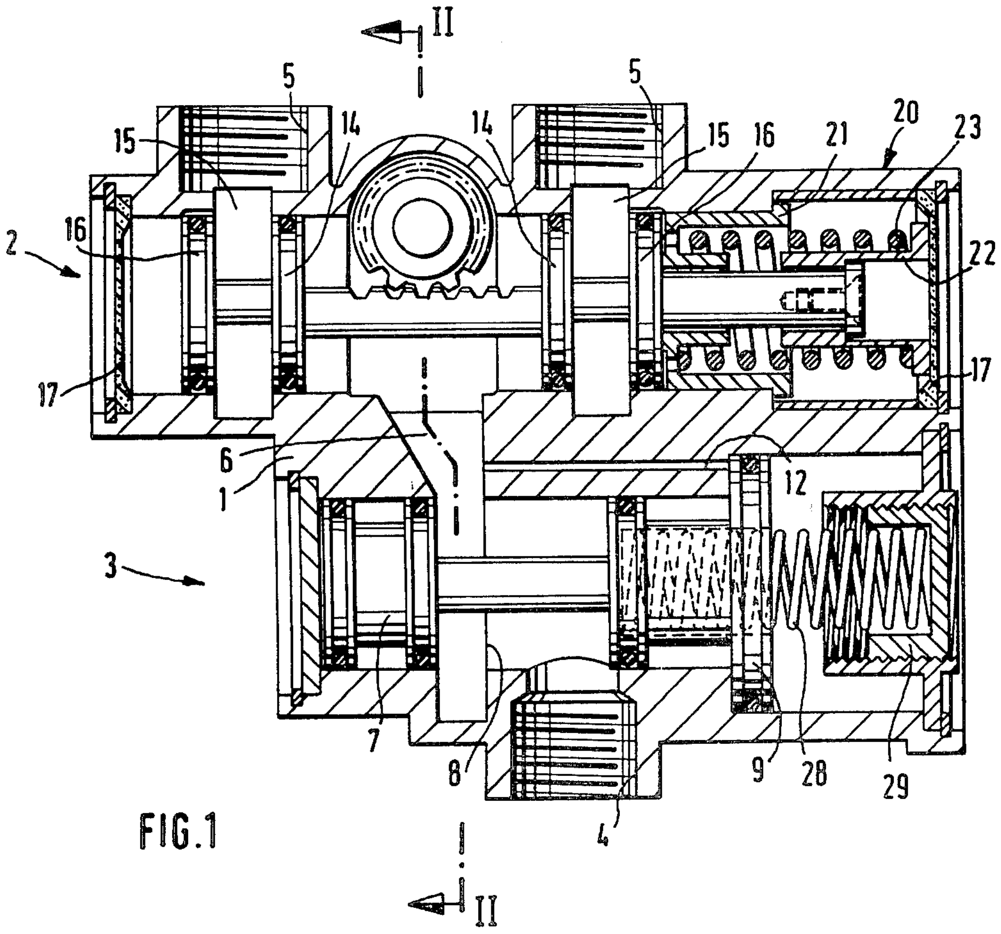
FIG. 1 illustrates a schematic cross sectional view through an embodiment of a pneumatic control apparatus according to the present invention.

The pneumatic control apparatus illustrated in FIG. 1 essentially comprises a housing 1 in which a shut-off-reversing valve 2 and a pressure reducing valve 3 are accommodated. A supply connection 4 for the supply of compressed air, is located on the bottom of the housing 1, whereas two control connections 5 each for one direction of movement of the pneumatic device which is connected downstream, are located on the top. Between the two valves 2 and 3, there is a very short and, based on the cross section, a large passage 6, into which passes compressed air which is only regulated as regards pressure.

To regulate the pressure, a shut-off member 7 is mounted in a displaceable manner in a bore. Upon full displacement of this member 7 (to the right in FIG. 1) its right hand sealing member meets with sealing edge 8 after which, passage through the pressure reducing valve 3 is completely blocked. This is the shut-off position. In the positions between this shut-off position and the maximum open position (to the left as illustrated in FIG. 1) all intermediate positions are possible and result in a correspondingly greater or lesser drop in pressure at the point between the shut-off member 7 and the sealing edge 8. The movement of the shut-off member 7 is caused by means of a control piston 9 which is charged on one side by the pressure within the passage 6 via a channel 12 and is charged by ambient pressure on the other side. A spring 28 acts in the direction of the ambient pressure and an adjusting screw 29 may be used to adjust the initial compression in this spring with respect to the control piston 9 and thus with respect to the shut-off member 7 which are both rigidly interconnected. The higher the initial compression in the spring 28, the greater the pressure must be which flows in through the channel 12 to the corresponding side of the control piston 9 from the passage 6 in order to reduce the passage opening between the shut-off member and the sealing edge 8 to such an extent that an equilibrium condition is achieved between the position and the pressure. The pressure which is required falls as the initial compression decreases.

The compressed air flowing into the shut-off reversing valve 2 through the passage 6 is enclosed in the illustrated shut-off position. Only by axial movement of a slide 13 and of sealing plates 14 attached thereto does one of the two sealing plates 14 pass into a recess 15, as a result of which, one of the control connections 5 is opened providing access thereto. The provision of the connection between the passage 6 to one of the control connections 5 also provides a connection between the surroundings and the other connection 5 via sound absorbing sintered plates 17 in the other control connection and the recess 15 into which the respective outer sealing plate 16 enters. Thus, while the pneumatic device is charged on one side, the other side is ventilated to the open, which applies to a piston-cylinder unit as well as to a pneumatic motor.

A device 20 for centering the shut-off reversing valve 2 in the illustrated shut-off position is located above the adjusting device for the pre-selectable determination of the pressure value at the pressure reducing valve 3. The device 20 comprises an outer collar bush 21 and another inner collar bush 22 which is smaller in diameter, and the bushes are each supported directly or indirectly on the housing 1 via their collars in their end position. A support spring 23 is positioned between the two collar bushes and this spring causes a maximum spacing under initial tension between the collar bushes 21 and 22. When the slide moves to the right hand side, the outer collar bush 21 enters a free space, the spring 23 being compressed. When the slide moves to the left-hand side, the inner collar bush 22 is entrained by a corresponding plunger, and in so doing, the bush 22 enters the outer bush 21. The spring 23 is also compressed during this action.

The arrangement of the slide 13 centering device 20 directly above the adjusting device for the pre-selectable determination of the pressure value at the pressure reducing valve 3 provides another optimization with respect to the constructional size of the housing 1. First of all, on the one hand, only a single spring 23 is required, for centering the slide 13 in both directions, and one the other hand, in this manner a space is used which would have had to be used anyway by the length of the underlying adjusting device in the form of the spring 28 and adjusting screw 29.

Figure 2:
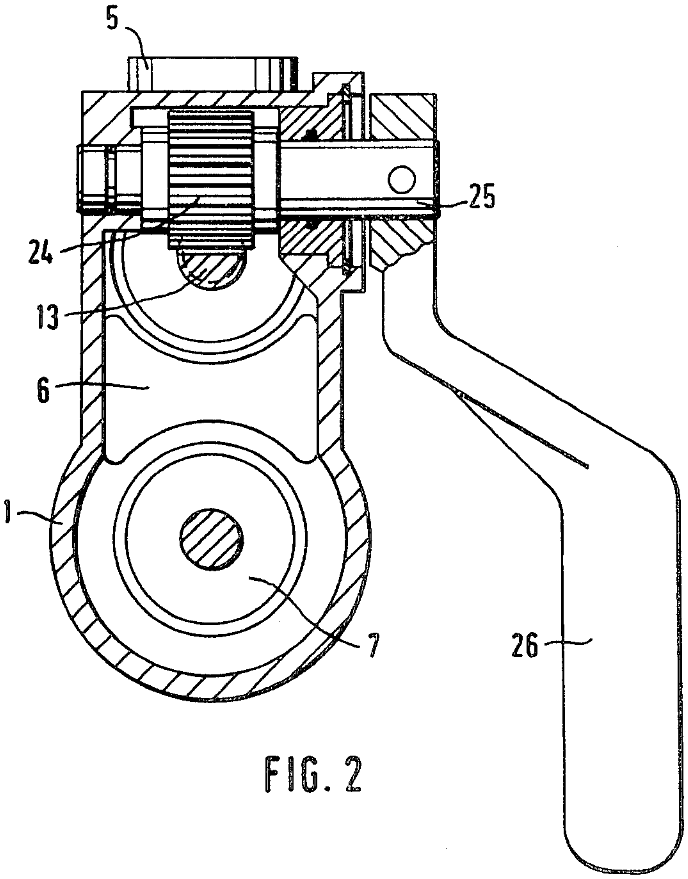
FIG. 2 illustrates a cross sectional view along line II—II in FIG. 1.

FIG. 2 shows, in particular, the operation of the slide 13 from the position illustrated in FIG. 1 to the right- and left-hand sides. A longitudinal toothed section is provided on the top of the slide 13, in which a pinion 24 engages. The pinion is connected to a hand lever 26 via a shaft 25, on which lever the adjusting movements are carried out manually. After the deflection of the lever 26, a return to the illustrated shut-off position is unnecessary, this resetting being effected automatically in the described manner by means of the device 20 for centering the slide 13.

As soon as the slide 13 has been moved out of the illustrated position, a considerable drop in pressure first of all occurs in the passage 6, because the compressed air now escapes via the corresponding control connection 5. The drop in pressure leads to a reduction in the charging of the control piston 9, the pressure being sensed via the channel 12. Consequently, the shutoff member 7 is moved far away from the control edge 8, so that the sudden drop in pressure is compensated for, as it were without delay, by the displacement of the slide 13. As soon as the pressure in the passage 6 has built up again to such an extent, due to the end position of the pneumatic unit or due to a load, that the pre-selected determined value is attained, this rise in pressure also causes a pressure increase on the control piston 9, with the result that the shut-off member 7 again approaches the control edge 8. Under stationary withdrawal conditions, a constant gap is adjusted between the shut-off member 7 and the control edge 8, and when the withdrawal is complete, this opening is almost completely closed opening again with a withdrawal increase when there is a corresponding drop in pressure.

What is claimed is:

1. A pneumatic control apparatus for operating control of various types of pneumatic devices comprising:

a single unitary housing having a pair of cylindrical valve receiving cavities formed therein;

an enlarged passage formed in said housing, said passage interconnecting and placing said cavities in communication with each other;

a cylindrical reciprocable shut-off reversing valve slidably mounted within one of said cavities for selectively shutting off and supplying a flow of compressed air to the pneumatic device, said valve having a centering device connected thereto to normally center said valve in the flow shut-off position within said one cavity;

a manually engagable hand lever carried by said housing and exposed exteriorly of said housing, said lever being connected to reciprocate said shut-off reversing valve away from said normal centered position; and a cylindrical reciprocable pressure reducing valve slidably mounted within the other of said cavities for restricting the pressure to a predetermined preselectable value, said pressure reducing valve having a shut-off member cooperable with a sealing edge of said other cavity disposed at said enlarged passage and a control piston connected with said member, one face of said piston being communicated to said enlarged passage to control movement of said shut-off member relative to said sealing edge.

2. A pneumatic control apparatus according to claim 1, wherein the longitudinal axes of said cavities containing the two valves are arranged parallel to each other.

3. A pneumatic control apparatus according to claim 1 wherein a channel for sensing the back pressure opens out in said enlarged passage for compressed air flow from the pressure reducing valve to said shut-off reversing valve.

4. A pneumatic control apparatus according to anyone of claims 1, 2 or 3 wherein said shut-off reversing valve is shut off in a middle position centered by spring force and said shut-off reversing valve opens the relevant control path in the respective adjacent side positions when actuated by said hand lever against said spring force, and a device for centering the shut-off reversing valve is positioned on the same side as an adjusting device for the pre-selectable determination of the pressure value at said pressure reducing valve.

* * * * *